United States Patent
Mizutani et al.

(10) Patent No.: US 9,396,840 B2
(45) Date of Patent: Jul. 19, 2016

(54) SHIELD CONDUCTING PATH

(71) Applicants: AUTONETWORKS TECHNOLOGIES, LTD., Yokkaichi-shi, Mie (JP); SUMITOMO ELECTRIC INDUSTRIES, LTD., Osaka-shi, Osaka (JP); SUMITOMO WIRING SYSTEMS, LTD., Yokkaichi-shi, Mie (JP)

(72) Inventors: Yoshio Mizutani, Yokkaichi (JP); Yuichi Kimoto, Yokkaichi (JP); Katsutoshi Izawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/742,350

(22) Filed: Jun. 17, 2015

(65) Prior Publication Data

US 2015/0287500 A1 Oct. 8, 2015

Related U.S. Application Data

(63) Continuation-in-part of application No. 13/520,039, filed as application No. PCT/JP2011/050395 on Jan. 13, 2011, now abandoned.

(30) Foreign Application Priority Data

Jan. 14, 2010 (JP) .................... 2010-005706

(51) Int. Cl.
*H01B 11/06* (2006.01)
*H01B 9/02* (2006.01)
(Continued)

(52) U.S. Cl.
CPC .............. *H01B 9/02* (2013.01); *H01B 9/006* (2013.01); *H02G 3/0481* (2013.01)

(58) Field of Classification Search
USPC ..... 174/110 R, 112, 113 R, 113 AS, 115, 116
See application file for complete search history.

(56) References Cited

U.S. PATENT DOCUMENTS

| 417,992 A | 12/1889 | Dell |
| 1,856,109 A * | 5/1932 | Murray ............... H01B 9/0666 |
| | | 138/108 |

(Continued)

FOREIGN PATENT DOCUMENTS

| DE | 102004058796 A1 | 9/2005 |
| JP | S55-117812 A | 9/1980 |

(Continued)

OTHER PUBLICATIONS

Oct. 27, 2014 Chinese Office Action issued in Application No. 201180006092.0.

(Continued)

*Primary Examiner* — William H Mayo, III
(74) *Attorney, Agent, or Firm* — Oliff PLC (57) ABSTRACT

A pipe includes a cylindrical tube main body in which electric wires are arranged, and a partition wall extending from an inner wall of the tube main body and partitioning an inner space of the tube main body into a first area and a second area. The partition wall includes: a pair of end convex portions and a concave portion. The end convex portions are edge portions of the partition wall and adjacent to the inner wall of the tube main body. Each of the end convex portions curves so as to protrude in a direction from the first area toward the second area. The concave portion is between the pair of end convex portions and curves so as to be recessed in an opposite direction from the direction in which the end convex portion protrudes. The inner wall of the tube main body includes ribs protruding inward of the tube main body and extending in the axial direction of the tube main body.

10 Claims, 9 Drawing Sheets

(51) Int. Cl.
*H02G 3/04* (2006.01)
*H01B 9/00* (2006.01)

(56) References Cited

U.S. PATENT DOCUMENTS

| | | | |
|---|---|---|---|
| 2,585,054 A | | 2/1952 | Stachura |
| 3,110,754 A | * | 11/1963 | Witort .................. H02G 3/0481 138/114 |
| 3,819,443 A | * | 6/1974 | Simons .................. B32B 15/08 156/204 |
| 4,052,911 A | | 10/1977 | Feldstein |
| 4,165,442 A | | 8/1979 | Gabriel et al. |
| 4,729,409 A | * | 3/1988 | Paul .................... H02G 3/0487 138/115 |
| 5,227,585 A | * | 7/1993 | Zen ...................... G02B 6/4459 138/115 |
| 5,269,377 A | | 12/1993 | Martin |
| 5,305,797 A | * | 4/1994 | Roy, Sr. ................ F16L 3/26 138/103 |
| 5,587,115 A | | 12/1996 | Allen |
| 5,920,032 A | * | 7/1999 | Aeschbacher ........ E21B 17/206 138/113 |
| 6,288,340 B1 | | 9/2001 | Arnould |
| 6,506,976 B1 | | 1/2003 | Neveux, Jr. |
| 6,564,831 B1 | * | 5/2003 | Sanoner ............. B29C 47/0028 138/115 |
| 6,624,359 B2 | * | 9/2003 | Bahlmann ............ H01B 11/085 174/113 C |
| 6,963,031 B2 | | 11/2005 | Gladfelter et al. |
| 7,335,837 B2 | | 2/2008 | Pfeiler et al. |
| 7,750,241 B2 | | 7/2010 | Watanabe |
| 8,525,029 B2 | * | 9/2013 | Kato .................. B60R 16/0215 174/113 R |
| 8,809,682 B2 | * | 8/2014 | Hepfinger ............. H02G 9/065 138/115 |
| 2009/0120664 A1 | | 5/2009 | Clark et al. |
| 2010/0051314 A1 | | 3/2010 | Watanabe et al. |
| 2011/0155458 A1 | * | 6/2011 | Kato .................. B60R 16/0215 174/74 R |
| 2013/0048366 A1 | | 2/2013 | O'Neil |
| 2013/0269981 A1 | | 10/2013 | Shiga et al. |

FOREIGN PATENT DOCUMENTS

| | | | | |
|---|---|---|---|---|
| JP | 2000-287324 A | * | 10/2000 | ............... G02B 6/46 |
| JP | 2006-269201 A | * | 10/2006 | ............... H01B 7/17 |
| JP | 2006-318680 A | | 11/2006 | |
| JP | 3909763 B2 | | 4/2007 | |

OTHER PUBLICATIONS

Jan. 22, 2014 Office Action issued in South Korean Application No. 10-2013-7031165.
Apr. 15, 2014 Office Action issued in Chinese Application No. 201180006092.9.
Aug. 21, 2013 Office Action issued in Chinese Patent Application No. 201180006092.9.
Aug. 27, 2013 Office Action issued in Korean Patent Application No. 10-2012-7019927.
Apr. 26, 2011 International Search Report issued in International Patent Application No. PCT/JP2011/050395.
Apr. 26, 2011 Written Opinion issued in International Patent Application No. PCT/JP2011/050395.
Sep. 29, 2011 Office Action issued in Japanese Patent Application No. 2010-005706.
Jun. 25, 2013 Office Action issued in Korean Patent Application No. 10-2012-7019927.
Apr. 28, 2015 Office Action issued in Chinese Patent Application No. 201180006092.9.
Oct. 22, 2015 Office Action issued in German Patent Application No. 11 2011 100 246.7.
Mar. 24, 2016 Office Action issued in German Patent Application No. 11 2011 100 246.7.

* cited by examiner

SHIELD CONDUCTING PATH

This is a Continuation-in-Part Application of application Ser. No. 13/520,039 filed Jun. 29, 2012 which is a National Phase of PCT/JP2011/050395 filed Jan. 13, 2011 which claims priority to JP-2015-095911 filed May 8, 2015 and JP2010-005706 filed Jan. 14, 2010. The disclosure of the prior applications are hereby incorporated by reference herein in their entirety.

TECHNICAL FIELD

The present invention relates to a shield conducting path.

BACKGROUND ART

Conventionally, there has been known a shield conducting path configured to protect and shield an electric wire by inserting a plurality of non-shielded electric wires into a pipe made of a metal (for example, see Patent Document 1).

Patent Document 1: Japanese Patent No. 3909763

However, in a vehicle such as a hybrid electric vehicle, plural types of electric wires, such as a power electric wire, through which a high voltage and large current flows, an electric wire of a weak current system and the like are arranged. At this point, for example, in the case that the power electric wire and the electric wire of the weak current system are inserted into a same pipe, it is necessary to insert them into the pipe after applying a shield, such as a braided wire, to the electric wire of the weak current system to prevent an influence of an electromagnetic noise generated by the power electric wire. Therefore, there is a problem that the number of the parts used is increased and it takes labor in processing.

As a result of studying the problem, it was found that the above problem can be solved by dividing an inner portion of the pipe into two or more sections by a flat partition wall. However, there has been a problem that, when a bending processing is applied to from the pipe having the above structure into a shape which is suited to an arranged position, the partition wall serves as a beam and it is hard to deform the pipe to an intended shape.

Therefore, there is a need in the art to provide a shield conducting path which allows insertion of plural types of electric wires therethrough, and is processable easily into a desired shape.

SUMMARY

The technique described herein relates to a shield conducting path including a plurality of electric wires and a metal pipe. Each of the electric wires includes an electric conductor and an insulation coating surrounding the electric conductor. The metal pipe is for shielding and protecting the electric wires arranged therein. The pipe includes a cylindrical tube main body in which the electric wires are arranged, and a partition wall continuing to an inner wall of the tube main body and partitioning an inner space of the tube main body into a first area and a second area. The partition wall includes a pair of end convex portions and a concave portion. The end convex portions are edge portions of the partition wall and adjacent to the inner wall of the tube main body. Each of the end convex portions curves so as to protrude from the first area toward the second area. The concave portion is between the pair of end convex portions and curves so as to be recessed in an opposite direction from the direction in which the end convex portion protrudes. The inner wall of the tube main body includes ribs protruding inward of the tube main body and extending in an axial direction of the tube main body.

According to the technique disclosed herein, the inner space of the tube main body is partitioned by the partition wall into the first area and the second area. Thus, by arranging the electric wires in the first area and the second area respectively, the electric wires can be easily shielded without shielding the wires individually.

Since the partition wall includes the pair of end convex portions and the concave portion, even when the pipe is bent in any directions, at least the end convex portions or the concave portion is bent. Accordingly, the pipe can be bent easily.

The ribs at the inner wall of the tube main body and the end convex portions and the concave portion of the partition wall form uneven surfaces. The first area and the second area are defined by the uneven surfaces and thus the electric wires are less likely to freely roll in the tube main body. Thus, collision of the electric wires in the tube main body or collision of the electric wires with the inner wall of the tube main body is less likely to occur. Accordingly, the electric wires can be reliably protected.

According to the present invention, it is possible to provide the shield conducting path which allows insertion of the plural types of electric wires therethrough and is processable easily into a desired shape.

DESCRIPTION OF REFERENCE NUMERALS

10: Shield conducting path
11: First electric wire (electric wire)
12: Electric conductor
13: Insulation coating
21: Second electric wire (electric wire)
22: Electric conductor
23: Insulation coating
30: Pipe
31: Cylinder portion (Tube main body)
31A: Inner wall
Y: Axial center of cylinder portion
32: Partition wall
34: First insertion space (Insertion space)
35: Second insertion space (Insertion space)
36: Clearance
37: Clearance
83: Partition part
110, 150: Shield conducting path
118, 161: First electric wire
119, 162: Second electric wire 120, 151: Pipe
121, 155: First area
122, 156: Second area
123A, 123B: Electric Conductor
124A, 124B: Insulation coating
125, 158: Tube main body
126, 159: Inner wall
128, 152: Partition wall
130, 153: End convex portion
132, 154: Concave portion
133, 160A, 160B, 160C: Rib
157: Intermediate convex portion
RA: Radius of curvature of end convex portion
RB: Radius of curvature of first electric wire

DETAILED DESCRIPTION OF PREFERRED EMBODIMENTS

<First Embodiment>

A description will be given of a first embodiment obtained by embodying the present invention with reference to FIG. 1. A shield conducting path 10 according to the first embodiment is structured such that it is arranged between devices (not illustrated), for example, a battery, an inverter, a motor constituting a power source for driving of a hybrid electric vehicle and two types of non-shielded type electric wires 11 and 21 are inserted into a pipe 30 which includes a bundle shielding function and an electric wire protecting function.

Figure 1:
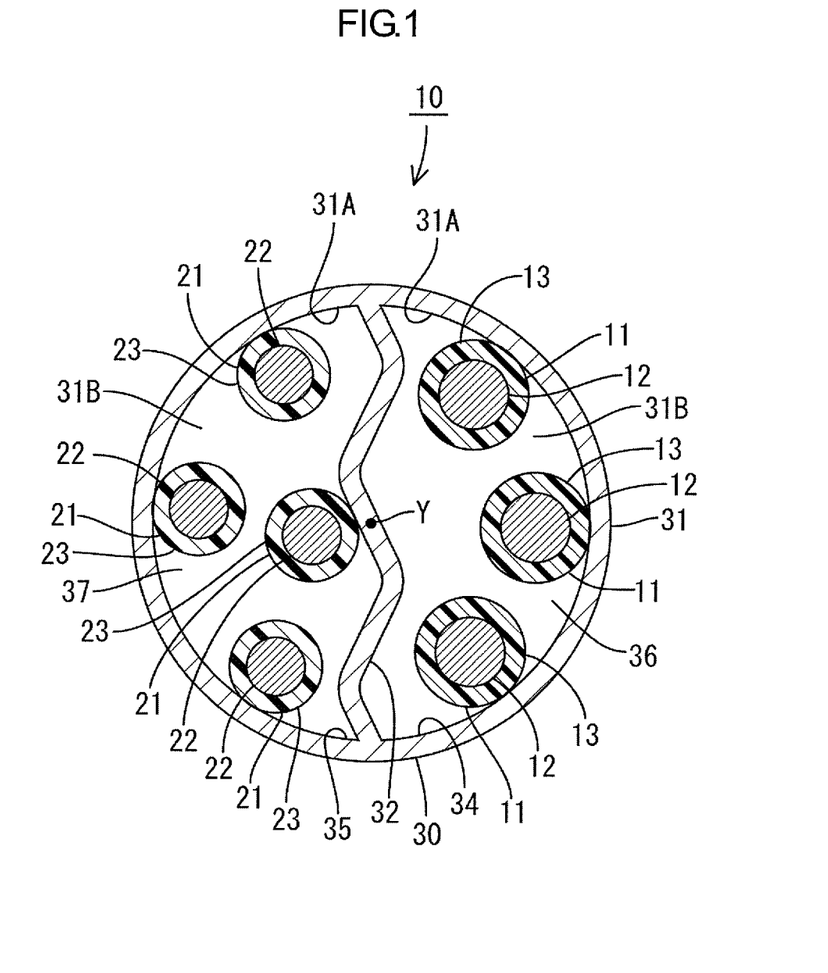
FIG. 1 is a cross sectional view of a shield conducting path according to a first embodiment.

In the present embodiment, three electric wires arranged in an insertion space 34 (details of which are described later) on a right side of FIG. 1 are first electric wires 11, four electric wires arranged in an insertion space 35 on a left side of FIG. 1 are second electric wires 21. Hereinafter, these wires are collectively referred to as two types of electric wires 11 and 21.

The two types of electric wires 11 and 21 are different in cross sectional diameter, and the first electric wire 11 is larger than the second electric wire 21 in the cross sectional diameter. The two types of electric wires 11 and 21 are respectively structured such that outer peripheries of electric conductors 12 and 22 which are made of a metal (for example, an aluminum alloy, an aluminum, a copper, a copper alloy or the like) are enclosed by insulation coatings 13 and 23 which are made of a synthetic resin.

Each of the electric conductors 12 and 22 of the two types of electric wires 11 and 21 is formed of a rod-like single core wire or a strand wire which is obtained by spirally bundling a plurality of thin wires, and is shaped to have an approximately circular cross section. The insulation coatings 13 and 23 are also shaped to have an approximate circle cross section on their outer periphery, in the same manner as the electric conductors 12 and 22.

The pipe 30 is made of a metal (for example, an aluminum alloy, a copper alloy or the like), and has a cylinder portion 31 (corresponding to a tube main body 31) which is formed to have an approximately circular cross section, and a partition wall 32 which is extended from an inner wall 31A of the cylinder portion 31 so as to partition an inner portion 31B of the cylinder portion 31. The cylinder portion 31 and the partition wall 32 are integrally formed by extrusion molding.

In this case, the partition wall 32 is formed over an entire length of the pipe 30, passes through an axial center Y of the cylinder portion 31 from one end portion of an inner peripheral surface (an inner wall) of the cylinder portion 31, and is formed over an inner peripheral surface which faces the one end portion. The partition wall 32 has a cross section which is curved like a sine curve in a direction orthogonal to an axial direction of the cylinder portion 31, as shown in FIG. 1. The partition wall 32 has a cross section which is approximately point symmetrical with respect to the axial center Y of the cylinder portion 31.

The inner portion 31B of the cylinder portion 31 is partitioned into two insertion spaces 34 and 35 by the partition wall 32. Each of the insertion spaces 34 and 35 is a space which is enclosed by the inner wall 31A of the cylinder portion 31 and the partition wall 32. The first electric wire 11 and the second electric wire 21 are inserted into the insertion spaces 34 and 35 respectively from an opening in one end side of the pipe 30. In the present embodiment, the insertion space 34 on a right side in FIG. 1 through which the first electric wire 11 is inserted is the first insertion space 34, and the insertion space 35 on a left side in FIG. 1 through which the second electric wire 21 is inserted is the second insertion space 35. Hereinafter, these two insertion spaces are collectively referred to as the insertion spaces 34 and 35.

There are clearances 36 and 37 between the insulation coating 13 of the inserted first electric wire 11 and the first insertion space 34 and between the insulation coating 23 of the inserted second electric wire 21 and the second insertion space 35, respectively.

Next, a description will be given of an operation and an effect of the present embodiment.

The two types of electric wires 11 and 21 are inserted into the inner portion 31B of the cylinder portion 31 of the pipe 30 when manufacturing the shield conducting path 10 according to the present embodiment. Three first electric wires 11 are inserted into the first insertion space 34 from the opening in the one end side of the pipe 30, and four second electric wires are inserted into the second insertion space 35. In the present embodiment, since the inner portion 31B of the cylinder portion 31A of the pipe 30 is partitioned by the partition wall 32, it is not necessary to apply any shield when inserting the two types of electric wires 11 and 21. Therefore, it does not take labor in processing and the number of the parts used is not increased. The insertion space is reduced by the partition wall, a surface area contacting with the electric wire is increased. Therefore, there is an effect that a heat generated by the electric wire is discharged.

When arranging the shield conducting path 10 according to the present embodiment which is manufactured as mentioned above, it is deformed into a shape which is suited to the arranged position. In the present embodiment, since the cross section of the partition wall 32 partitioning the cylinder portion 31 is curved shape, it is easy to deform the shielded conducting path 10.

Particularly, in the present embodiment, since the clearances 36 and 37 are provided between the first and second insertion spaces 34 and 35 and the outer peripheral surfaces of the respective insulation coatings 13 and 23 of the two types of electric wires 11 and 21, a bending processing can easily be carried out without damaging the insulation coatings 13 and 23 of the electric wires 11 and 21. Further, since the cross sectional shape of the partition wall 32 is formed point symmetrically the partition wall 32 is easily bent, and therefore can be more easily processed into a desired shape.

As mentioned above, according to the present embodiment, it is possible to provide the shield conducting path 10 which allows insertion of the plural types of electric wires 11 and 21 therethrough, and can be processed easily into a desired shape.

<Second Embodiment>

A description will be given of a second embodiment obtained by embodying the present invention with reference to FIG. 2. A shield conducting path 40 according to the present embodiment is structured so as to be arranged between devices (not illustrated) in the same manner as the first embodiment, and is structured such that three types of non-shielded type electric wires 51, 61 and 71 are inserted into a pipe 80 having a bundle shielding function and an electric wire protecting function.

Figure 2:
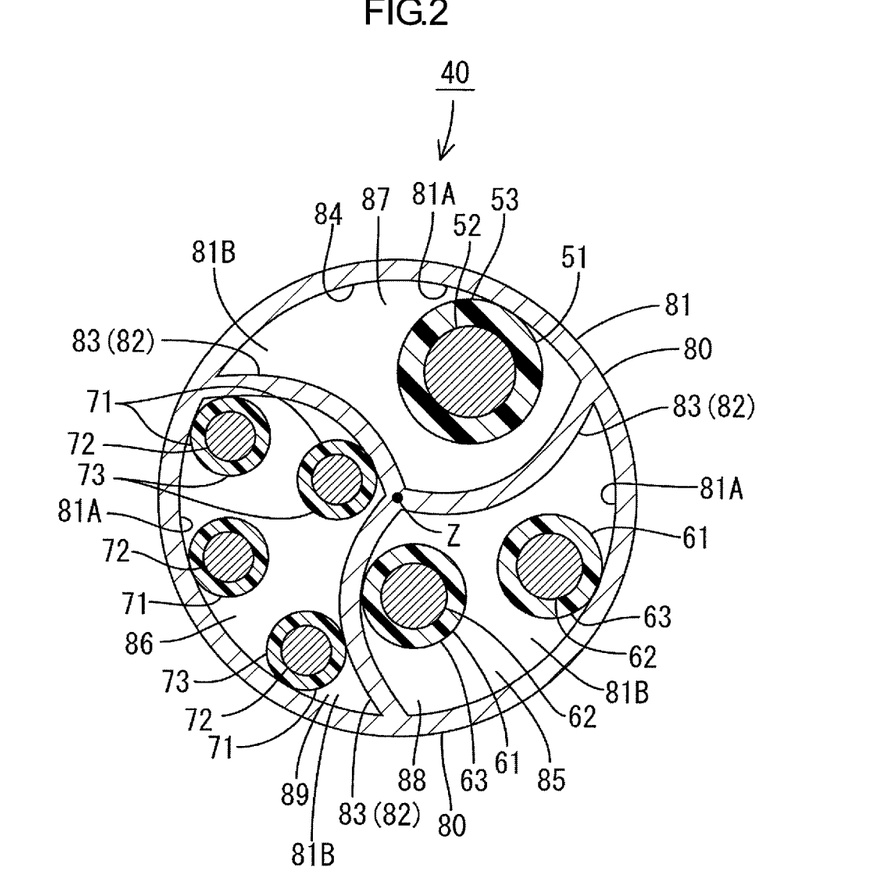
FIG. 2 is across sectional view of a shield conducting path according to a second embodiment.

In the present embodiment, one electric wire arranged in an insertion space 84 (details of which are mentioned later) on an upper side of FIG. 2 is a third electric wire 51, two electric wires arranged in an insertion space 85 on a right lower side of FIG. 2 are a fourth electric wire 61, four electric wires arranged in an insertion space 86 on a left lower side of FIG. 2 are fifth electric wires 71. Hereinafter, these electric wires are collectively referred to as three types of electric wires 51, 61 and 71.

The three types of electric wires 51, 61 and 71 are different in their cross sectional diameter, and the cross sectional diameter is larger in the order of the third electric wire 51, the fourth electric wire 61 and the fifth electric wire 71. The three types of electric wires 51, 61 and 71 are respectively structured such that outer peripheries of electric conductors 52, 62 and 72 which are made of a metal (for example, an aluminum alloy, an aluminum, a copper, a copper alloy) are enclosed by insulation coatings 53, 63 and 73, which are made of a synthetic resin.

Each of the electric conductors 52, 62 and 72 of the three types of electric wires 51, 61 and 71 is formed of a rod-like single core wire or a stranded wire which is obtained by spirally bundling a plurality of thin wires, and is shaped to have an approximately circular cross section. The insulation coatings 53, 63 and 73 have a cross section which is approximately circular in the on their outer periphery, in the same manner as the electric conductors 52, 62 and 72.

The pipe 80 is made of a metal (for example, an aluminum alloy, a copper alloy or the like), and has a cylinder portion 81 (corresponding to a tube main body 81) which is formed to have an approximately circular cross section, and a partition wall 82 which is extended from an inner wall 81A of the cylinder portion 81 so as to partition an inner portion 81B of the cylinder portion 81. The cylinder portion 81 and the partition wall 82 are integrally formed by extrusion molding.

The partition wall 82 is formed over an entire length of the pipe 80, is configured by three partition parts 83, 83 and 83 which are formed into a circular arc shape and extended from the inner wall 81A of the cylinder portion 81 to an axial center Z of the cylinder portion 81. The partition wall 82 has a cross section of a curved shape when cut in a direction orthogonal to an axial direction of the cylinder portion 81 as shown in FIG. 2. The extended ends (the end portions in the side of the axial center Z) of three partition parts 83, 83 and 83 are connected to each other and integrated in the axial center Z of the cylinder portion 81. Further, the three partition parts 83, 83 and 83 have the identical shape and are arranged at an even pitch of 120 degrees in a peripheral direction of the inner wall 81A of the cylinder portion 81.

The inner portion 81B of the cylinder portion 81 is partitioned into three insertion spaces 84, 85 and 86 by the partition wall 82. Each of the insertion spaces 84, 85 and 86 is a space which is enclosed by the inner wall 81A of the cylinder portion 81 and the partition wall 82. The third electric wire 51, the fourth electric wire 61 and the fifth electric wire 71 are inserted respectively into the insertion spaces 84, 85 and 86 from an opening in one end side of the pipe 80. In the present embodiment, the insertion space 84 on an upper side of the FIG. 2 through which the third electric wire 51 is inserted is the third insertion space 84, the insertion space 85 on a right lower side of the FIG. 2 through which the fourth electric wire 61 is inserted is the fourth insertion space 85, the insertion space 86 on a left side of the FIG. 2 through which the fifth electric wire 71 is inserted is the fifth insertion space 86. Hereinafter these three insertion spaces are collectively referred to as the insertion spaces 84, 85 and 86.

There are clearances 87, 88, and 89 between the insulation coating 53 of the inserted third electric wire 51 and the third insertion space 84, between the insulation coating 63 of the inserted fourth electric wire 61 and the fourth insertion space 85, and between the insulation coating 73 of the inserted fifth electric wire 71 and the fifth insertion space 86, respectively.

Next, a description will be given of an operation and an effect of the present embodiment.

The three types of electric wires 51, 61 and 71 are inserted into the inner portion 81B of the cylinder portion 81 of the pipe 80 when manufacturing the shield conducting path 40 according to the present embodiment. A single third electric wire 51 is inserted into the third insertion space 84 from the opening in the one end side of the pipe 80, two fourth electric wires 61 are inserted into the fourth insertion space 85, and four fifth electric wires 71 are inserted into the fifth insertion space 86. In the present embodiment, since the inner portion 81B of the cylinder portion 81 of the pipe 80 is partitioned by the partition wall 82, it is not necessary to apply any shield when inserting plural types of electric wires 51, 61 and 71. Therefore, it does not take labor in processing and the number of the parts is not increased.

When arranging the shield conducting path 40 according to the present embodiment which is manufactured as mentioned above, it is deformed into a shape suited to the arranged position. In the present embodiment, since the cross sectional shape of the partition wall 82 partitioning the cylinder portion 81 is formed in a curved shape, it is easily deformed.

Particularly, in the present embodiment, since the clearances 87, 88 and 89 are provided between the respective insertion spaces 84, 85 and 86 and the outer peripheral surfaces of the insulation coatings 53, 63 and 73 of the electric wires, a bending processing can easily be carried out, and it is processed into a desired shape more easily.

As mentioned above, according to the present embodiment, it is possible to provide the shield conducting path 40 which allows insertion of three types of electric wires 51, 61 and 71, and can easily be processed into a desired shape.

<Third Embodiments>

In the above embodiment, as the partition wall, there are shown the structure in which the cross sectional shape is curved and point symmetric, and the structure configured by a plurality of partition parts which is of the same shape and extended from the inner wall of the tube main body to the axial center of the tube main body and are arranged in the inner wall of the tube main body so as to be spaced at even intervals. However, the structure is not limited to this.

Figure 3:
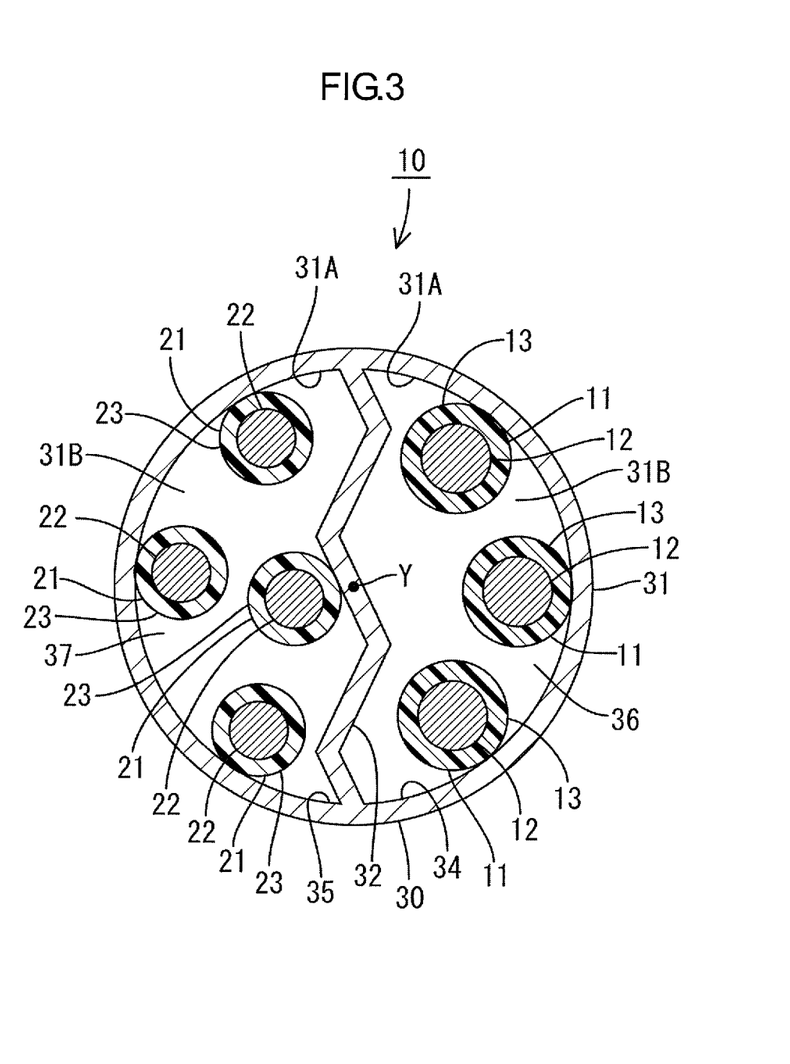
FIG. 3 is across sectional view of a shield conducting path according to a third embodiment.

The structure of the partition wall may be optional as long as the cross section has a curved shape or a bent shape. For example, the partition wall may have a bent cross section as shown in FIG. 3. It is to be noted that the shield conducting path shown in FIG. 3 has the same structure as the shield conducting path according to the first embodiment except that the cross sectional shape of the partition wall is the bent shape.

Further, the partition wall may be formed line symmetrically, a partition wall having a circular arc shaped cross section may be formed at a position which does not uniformly divide the inner portion of the tube main body, or a plurality of partition walls may be arranged. Further, the partition wall may be formed by arranging a plurality of partition parts of the same shape at uneven intervals. Further, the partition wall may be formed by arranging a plurality of partition parts having different shapes at either even or uneven intervals.

<Outline of Embodiments>

The technique disclosed herein relates to a shield conducting path including a plurality of electric wires each of which is formed by enclosing an electric conductor with an insulation coating, and a metal pipe for shielding and protecting the electric wires arranged therein. The pipe includes a cylindrical tube main body in which the electric wires are arranged; and a partition wall extending from an inner wall of the tube main body and partitioning an inner space of the tube main body into a first area and a second area. The partition wall includes a pair of end convex portions and a concave portion. The end convex portions are edge portions of the partition wall and adjacent to the inner wall of the tube main body. Each of the end convex portions has a curved shape that projects in a direction from the first area toward the second area. The concave portion is between the pair of end convex portions and has a curved shape that is recessed in a direction opposite from the direction in which the end convex portion protrudes. The inner wall of the tube main body includes ribs protruding inward of the tube main body and extending in an axial direction of the tube main body.

According to the technique disclosed herein, the inner space of the tube main body is partitioned by the partition wall into the first area and the second area. Thus, the electric wires can be respectively arranged into the first area and the second area and thus the electric wires are easily shielded without shielding the electric wires individually.

Because the partition wall includes the pair of end convex portions and the concave portion, even if the pipe is bent in any directions, at least the end convex portions or the concave portion is bent. Accordingly, the pipe can be bent easily.

In the first area and the second area, the ribs at the inner wall of the tube main body, and the end convex portions and concave portion of the partition wall form uneven shapes. The uneven shapes prevent the electric wires from freely rolling in the tube main body. Thus, collision of the electric wires in the tube main body or collision of the electric wires with the inner wall of the tube main body is less likely to occur, and accordingly, the electric wires can be reliably protected.

In the shield conducting path, the radius of curvature of the end convex portions is equal to the radius of the electric wire in the first area, or greater than the radius of the electric wire in the first area.

According to the above embodiment, the electric wires are less likely to be stuck in the end convex portions at the first area side. Thus, when the pipe is bending, the electric wires are less likely to be stuck in and compressed by the end convex portions at the first area side. As a result, the electric wires are protected when the pipe is processed to be bent.

In the shield conducting path, the ribs are at a portion of the inner wall of the tube main body facing the second area, and opposite the respective end convex portions of the partition wall.

According to the above embodiment, in the second area, spaces between the ribs and the respective end convex portions are smaller than those of the other portions. Thus, the electric wire is less likely to pass and roll though the spaces between the ribs and the end convex portions.

In the shield conducting path, the distances between the ribs and the respective end convex portions are smaller than the diameter of the electric wire in the second area.

According to the above embodiment, the electric wire is less likely to pass and roll though the spaces between the ribs and the end convex portions.

In the shield conducting path, the partition wall includes the intermediate convex portion that is a different portion from the end convex portions and having a curved shape that bulges in the direction from the first area toward the second area, and the inner wall further includes a rib opposite the intermediate convex portion.

According to the above embodiment, in the second area, the space between the rib and the intermediate convex portion is smaller than those of the other portions. Thus, the electric wires can be prevented from passing and rolling between the rib and the intermediate convex portion.

In the shield conducting path, of the plurality of electric wires, a first electric wire in the first area and a second electric wire in the second area may be of different types.

According to the above embodiment, by arranging the different types of electric wires in the first area and the second area, the multiple types of electric wires can be shielded without shielding the multiple types of wires individually.

In the shield conducting path, a portion of the inner wall of the tube main body facing the first area and a wall surface of the partition wall facing the first area smoothly continue to each other. The portion of the inner wall of the tube main body facing the second area and a wall surface of the partition wall facing the second area smoothly continue to each other.

When the pipe is bending, the stress tends to be concentrated at boundary portions between the inner wall of the tube main body and the partition wall. According to the present embodiment, the boundary portions between the inner wall of the tube main body and the partition wall continue to each other smoothly. Thus, the stress is less likely to concentrate at the boundary portions between the inner wall of the tube main body and the partition wall. As a result, it is not necessary to strictly consider the strength of the boundary portions between the tube main body inner wall and the partition wall for bending process the pipe. Accordingly, the bending process of the pipe is easily performed. In this description, "the smooth continuation of the boundary portions" means that the curvature gradually changes from the inner wall of the tube main body to the wall surface of the partition wall.

<Fourth Embodiment>

A description will be given of a fourth embodiment with reference to FIGS. 4 to 8. In the following description, for a plurality of identical members, only some of the members may be designated by reference numerals, and reference numerals for the other members may be omitted.

Figure 4:
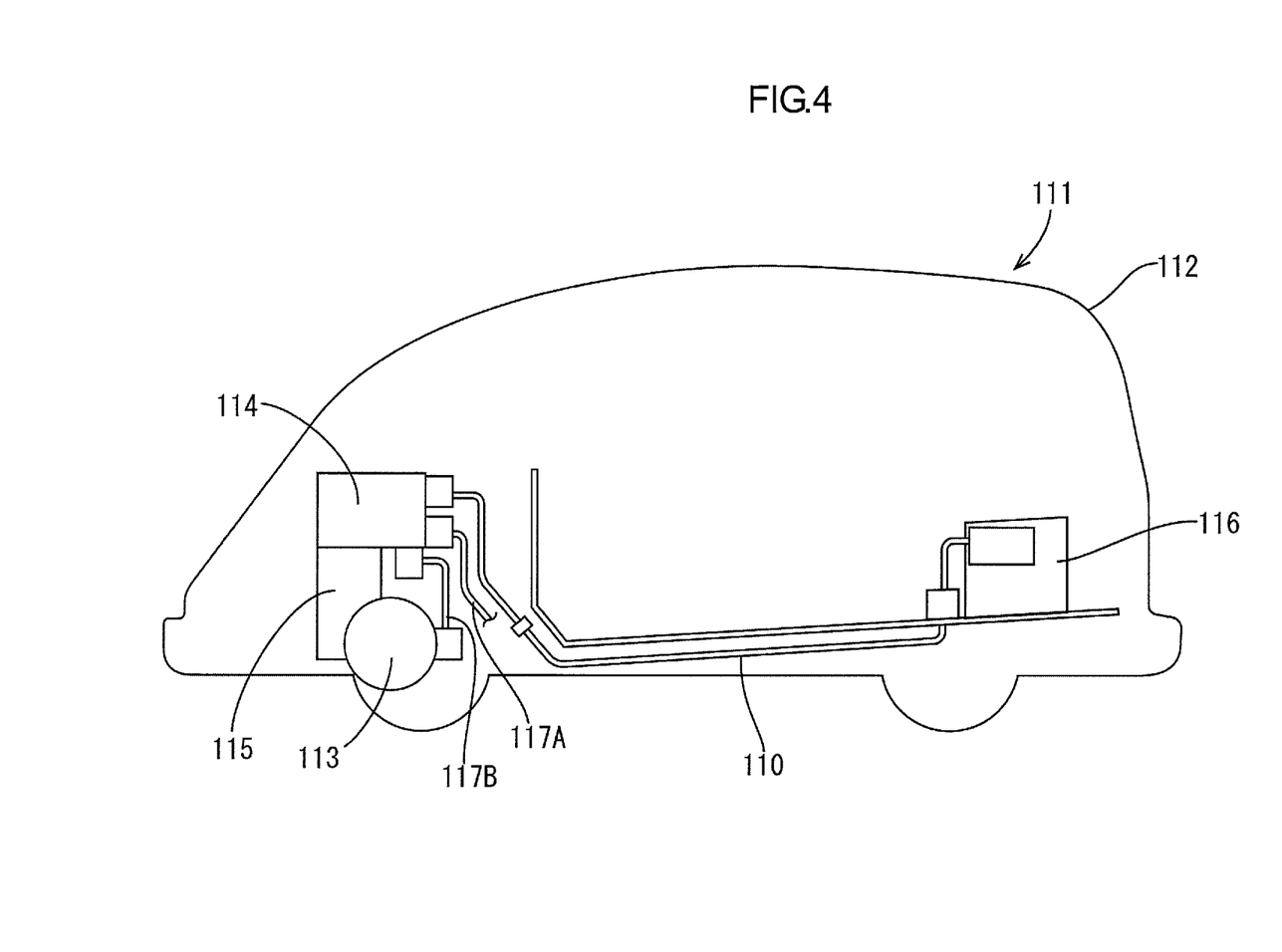
FIG. 4 is a schematic diagram of a shield conducting path according to a fourth embodiment mounted on a vehicle.

As illustrated in FIG. 4, a shield conducting path 110 according to the present embodiment is installed in a vehicle 111 such as an electric vehicle or a hybrid vehicle. An engine room is provided in a front area in a vehicle body 112 of the vehicle 111. A motor 113, an inverter 114 constituting a power circuit for driving the motor 113, and a gasoline-driven engine 115 are disposed in the engine room. A battery 116 constituting the power circuit is mounted in the rear of the vehicle body 112. The shield conducting path 110 and an in-vehicle conducting path 117A are routed between the inverter 114 and the battery 116. An in-vehicle conducting path 117B is routed between the inverter 114 and the motor 113.

The shield conducting path 110 according to the present embodiment includes two types of non-shielded electric wires 118 and 119 arranged in a pipe 120. The pipe 120 has a bundle shielding function and an electric wire protecting function.

In the present embodiment, two first electric wires 118 are arranged in a first area 121 (details of which are described later) which is closer to an upper side in FIG. 5. One second electric wire 119 is arranged in a second area 122 that is closer to a lower side in FIG. 5. These wires are collectively referred to as two types of electric wires 118 and 119.

The two types of electric wires 118 and 119 are different in cross sectional diameter, and the diameter of the first electric wires 118 is smaller than the diameter of the second electric wire 119. The electric wires 118 and 119 include electric conductors 123A and 123B made of metal (for example, an aluminum alloy, aluminum, copper, a copper alloy) and include insulation coatings 124A and 124B made of synthetic resin, respectively. The electric conductors 123A and 123B are surrounded by the respective insulation coatings 124A and 124B.

Each of the electric conductors 123A and 123B of the two types of electric wires 118 and 119 is formed of a stranded wire obtained by spirally bundling thin wires, and is shaped to have an approximately circular cross section. The insulation coatings 124A and 124B are also shaped such that outer peripheries thereof have a circular cross section, in the same manner as the electric conductors 123A and 123B. The electric conductors 123A and 123E of the two types of electric wires 118 and 119 may be formed of a rod-like single core wire.

In the present embodiment, the first electric wires 118 and the second electric wire 119 are of different types. For example, one of the first electric wires 118 and the second electric wire 119 may be a high-voltage electric wire while the other may be a low-voltage electric wire. In the present embodiment, the first electric wire 118 is of high-voltage type and the second electric wire 119 is of low-voltage type.

The pipe 120 is made of metal (for example, an aluminum alloy, a copper alloy, a stainless steel) and includes a tube main body 125 and a partition wall 128. The tube main body 125 has a cylindrical shape with a substantially circular cross section. The partition wall 128 extends from an inner wall 126 of the tube main body 125 and partitions an inner space 127 of the tube main body 125. The tube main body 125 and the partition wall 128 are integrally formed as a unitary single member by extrusion molding. The metal constituting the pipe 120 may be selected as needed. On an outer surface or an inner surface of the pipe 120, a plated layer or a paint layer may be formed as needed.

The partition wall 128 is formed over the entire length of the pipe 120. The partition wall 128 continues from one portion of the inner wall 126 of the tube main body 125 to another portion of the inner wall 126 opposite to the one portion. The partition wall 128 has a gently curved cross section in a direction perpendicular to the axis direction (penetrating the sheet having FIG. 5) of the tube main body 125, as illustrated in FIG. 5.

By the partition wall 128, the inner space 127 of the tube main body 125 is partitioned into the first area 121 and the second area 122. The first area 121 and the second area 122 are spaces enclosed by the inner wall 126 of the tube main body 125 and the partition wall 128. In the first area 121, the first electric wires 118 are inserted from an opening at an end of the pipe 120. Similarly, in the second area 122, the second electric wire 119 is inserted from an opening at the end of the pipe 120. In the present embodiment, with reference to FIG. 5, the first area 121 is the upper space into which the first electric wires 118 are inserted, while the second area 122 is the lower space into which the second electric wire 119 is inserted.

Between the insulation coatings 124A of the first electric wires 118 in the first area 121 and the partition wall 128 and the inner wall 126 of the tube main body 125, clearances 129A are present, respectively. Between the insulation coating 124B of the second electric wire 119 in the second area 122 and the partition wall 128 and the inner wall 126 of the tube main body 125, clearances 129B are present.

Figure 5:
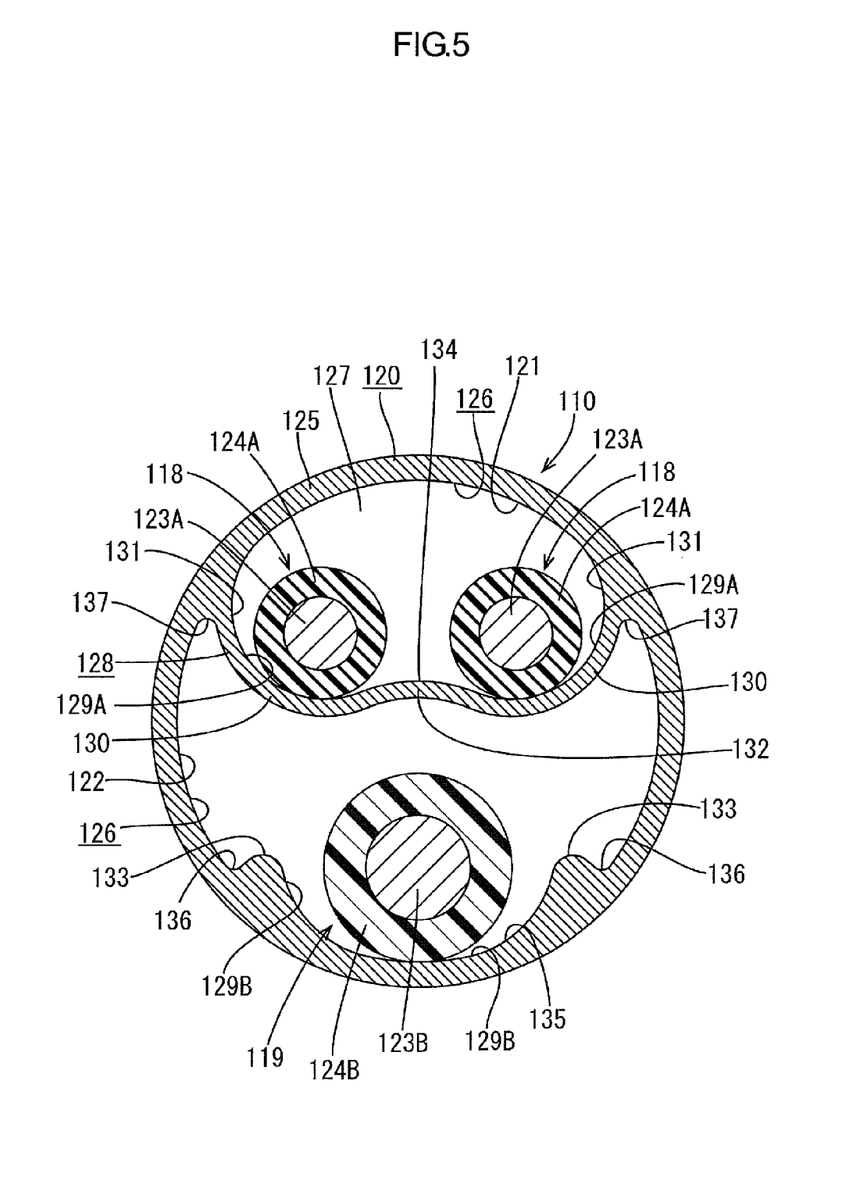
FIG. 5 is a cross sectional view of a shield conducting path.

As illustrated in FIG. 5, the partition wall 128 includes a pair of end convex portions 130. One of the end convex portions 130 is a portion of the partition wall 128 closer to the left in FIG. 5 and another one of the end convex portions 130 is a portion of the partition wall 128 closer to the right in FIG. 5. Each end convex portion 130 curves so as to protrude in a downward direction (from the first area 121 toward the second area 122). The end convex portions 130 are portions of the partition wall 128 adjacent to portions of the inner wall 126 of the tube main body 125 from which the partition wall 128 extend.

Figure 6:
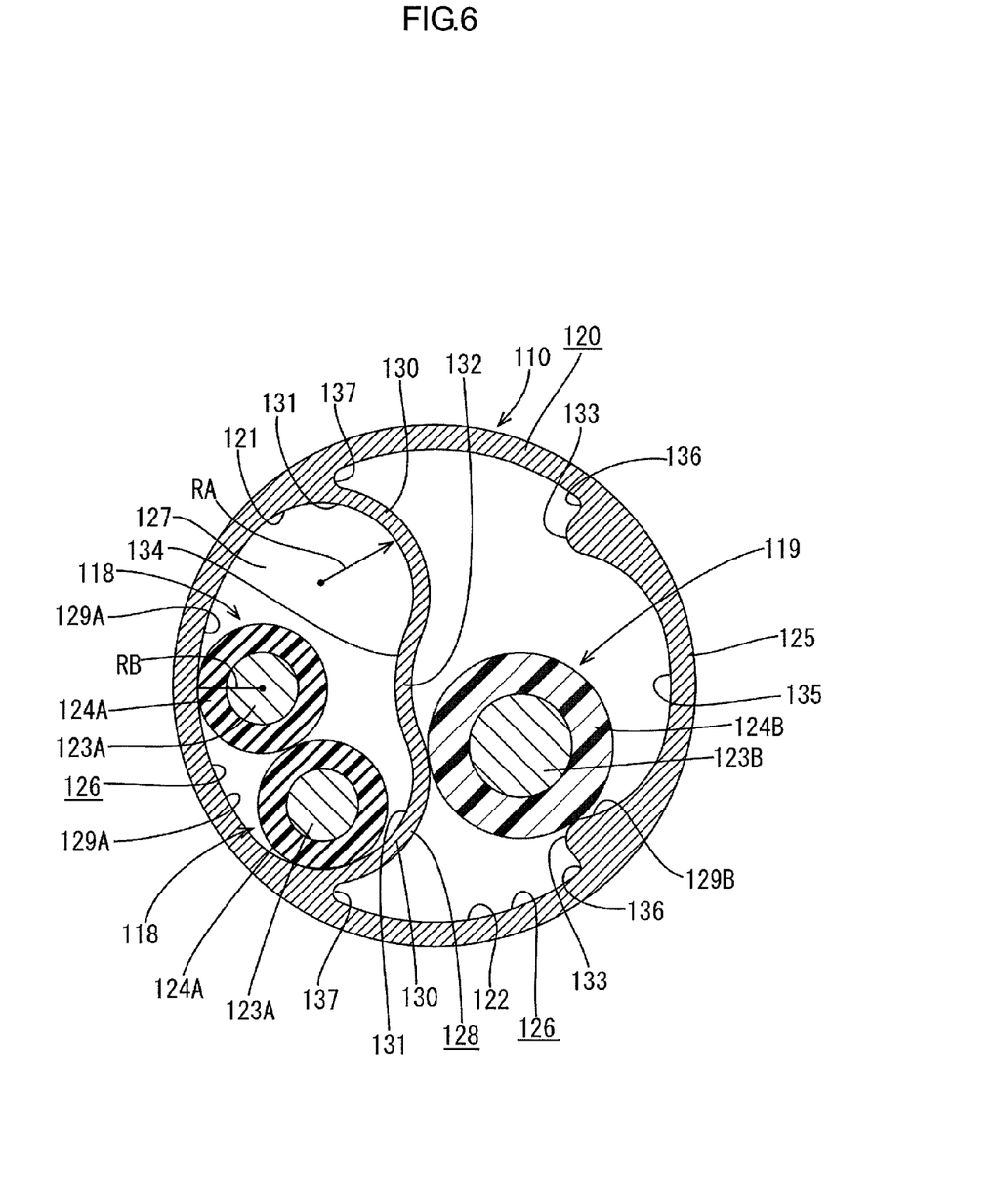
FIG. 6 is a cross sectional view of the shield conducting path disposed in a posture different from FIG. 5.

As illustrated in FIG. 6, a radius of curvature RA of the end convex portions 130 is the same as a radius RB of the first electric wires 118 or greater than the radius RB of the first electric wires 118. In the present embodiment, the radius of curvature RA of the end convex portions 130 is greater than the radius RB of the first electric wires 118. In the present embodiment, the radius RB of the first electric wires 118 is the outer diameter of the insulation coating 124A coating the electric conductor 123A.

In the present embodiment, the radius of curvature RA of each end convex portion 130 is the same. The radius of curvature RA of the pair of end convex portions 130 may be set to different values.

A portion of the inner wall 126 of the tube main body 125 facing the first area 121 and a wall surface of the partition wall 128 facing the first area 121 continue each other with smoothly curved surfaces 131 therebetween. More specifically, the portion of the inner wall 126 of the tube main body 125 and a wall surface of the end convex portions 130 facing the first area 121 smoothly continue to one another. In other words, no clear boundaries or steps are present between the portion of the inner wall 126 of the tube main body 125 facing the first area 121 and the wall surface of the end convex portions 130 facing the first area 121.

As illustrated in FIG. 5, the partition wall 128 includes a concave portion 132 between the pair of end convex portions 130. The concave portion 132 curves to as to be recessed in the opposite direction from the direction in which the end convex portions 120 protrudes (from the second area 122 toward the first area 121). In the present embodiment, the concave portion 132 is between of the pair of end convex portions 130 of the partition wall 128, namely, at a middle of the partition was 128.

Surfaces of the pair of end convex portions 130 facing the first area 121 and a surface of the concave portion 132 facing the first area 121 smoothly continue to one another so as to have curved surfaces 134. In other words, on the wall surface of the partition wall 128 on the first area 121 side, no clear boundaries or steps are present between the pair of end convex portions 130 and the concave portion 132.

The tube main body 125 includes two ribs 133 at the portion of the inner wall 126 facing the second area 122. The ribs 133 protrude inward of the tube main body 125. The ribs 133 extend in the axial direction of the tube main body 125 (the direction penetrating the sheet of FIG. 5) over the entire length of the tube main body 125. The tube main body 125 and the ribs 133 are integrally formed as a unitary single member by extrusion molding.

Of the inner wall 126 of the tube main body 125, a portion between vertexes of the two ribs 133 continue to the vertexes of the two ribs 133 with smoothly curved surfaces 135. Portions of the inner wall 126 of the tube main body 125 outside the two ribs 133 in the right-left direction in FIG. 5 and the two ribs 133 continue to each other with smoothly curved surfaces 136 therebetween. Thus, no clear boundaries or steps are present between the two ribs 133 and the inner wall 126 of the tube main body 125.

The two ribs 133 are at positions opposite the respective end convex portions 130 of the partition wall 128. The distance between the vertex of the rib 133 and the corresponding end convex portion 130 is smaller than the diameter (outer diameter) of the second electric wire 119 (see FIG. 6). Thus, the second electric wire 119 is less likely to pass through the space between the rib 133 and the end convex portion 130.

The portion of the inner wall 126 of the tube main body 125 facing the second area 122 and a wall surface of the partition wall 128 facing the second area 122 continue to each other with smoothly curved surfaces 137 therebetween. In other words, no clear boundaries or steps are present between the portion of the inner wall 126 of the tube main body 125 facing the second area 122 and the wall surface of the partition wall 128 facing the second area 122.

(Manufacturing Process According to Embodiment)

A description will be given of one example of a manufacturing process according to the present embodiment. It should be noted that the manufacturing process according to the present embodiment is not limited to the following description.

In production of the shield conducting path 110 of the present embodiment, the two types of electric wires 118 and 119 are inserted into the inner space 127 of the tube main body 125 of the pipe 120. The two first electric wires 118 are inserted into the first area 121 via the opening at the end of the pipe 120 and the second electric wire 119 is inserted into the second area 122 via the opening at the end of the pipe 120.

Subsequently, a bending process is performed to the pipe 120. The bending process for the pipe 120 may be performed before the two types of electric wires 118 and 119 are inserted.

Figure 7:
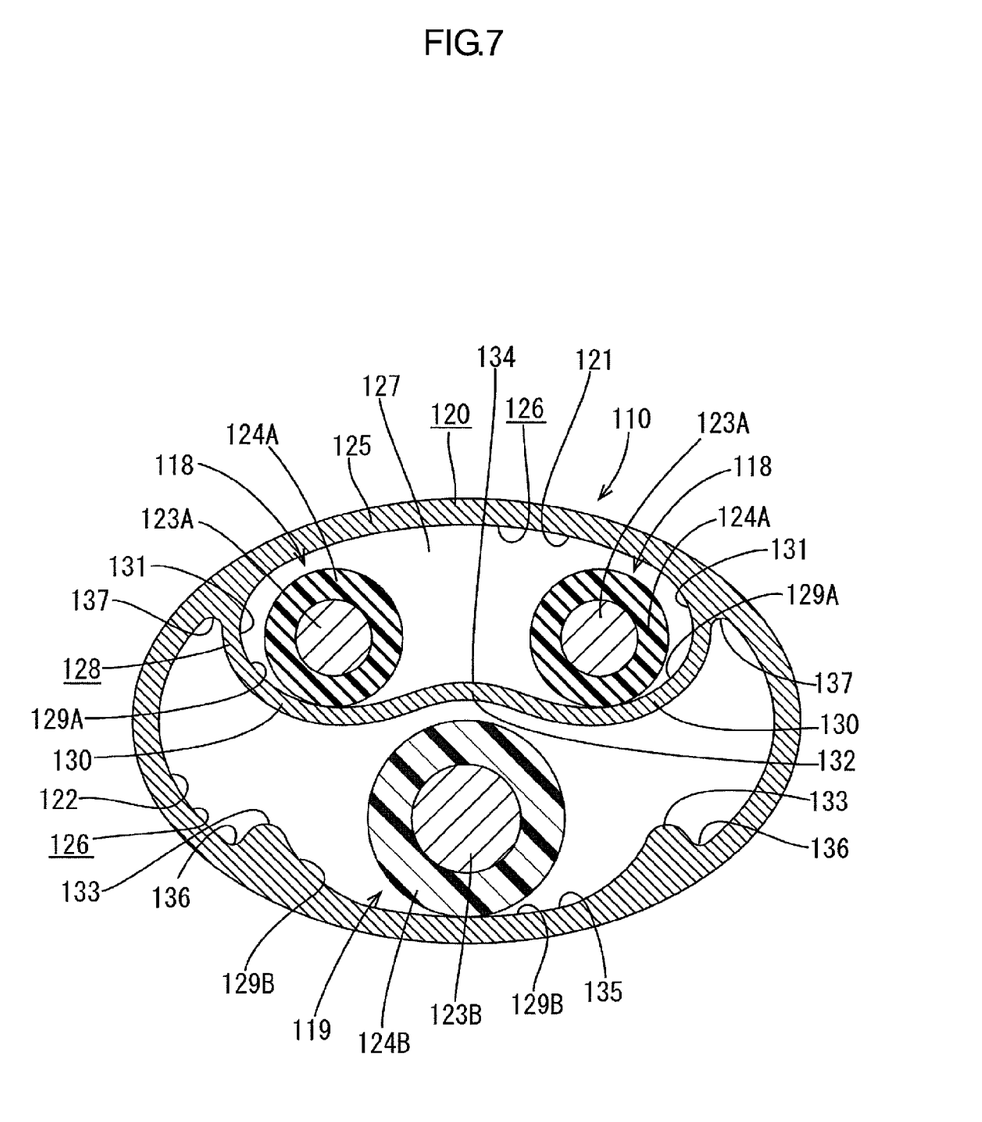
FIG. 7 is a cross sectional view of a pipe in a bent state.

In the bending process for the pipe 120, how the pipe 120 is positioned is not particularly limited. For example, as illustrated in FIG. 7, the pipe 120 may be bent such that the pipe 120 is decreased in diameter in a direction perpendicular to the partition wall 128 (the top-bottom direction in FIG. 7). In this case, the pipe 120 is decreased in diameter in the direction perpendicular to the partition wall 128 (the top-bottom direction in FIG. 7). On the other hand, the pipe 120 is increased in diameter in the right-left direction in FIG. 7. In this case, the end convex portions 130 of the partition wall 128 are deformed such that the curvatures of the end convex portion 130 are decreased in accordance with the pipe 120. On the other hand, the concave portion 132 is deformed such that its curvature is increased due to compressive force from the pair of end convex portions 130.

Figure 8:
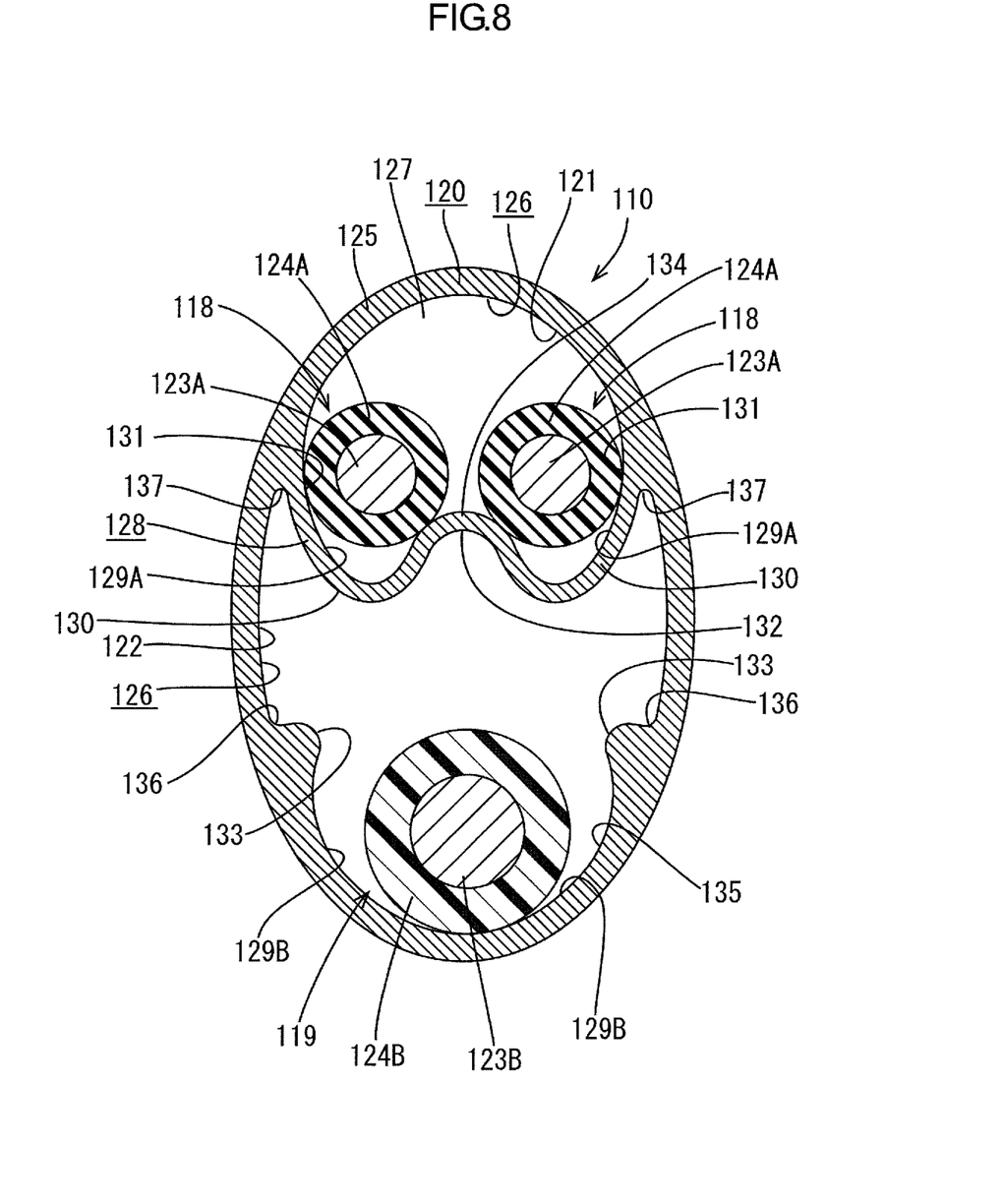
FIG. 8 is a cross sectional view of a pipe in a bent state.

Another example will be described in which, as illustrated in FIG. 8, the pipe 120 may be bent such that the pipe 120 is increased in diameter in the direction perpendicular to the partition wall 128 (the top-bottom direction in FIG. 8). In this case, the pipe 120 is increased in diameter in the direction (the top-bottom direction in FIG. 8) perpendicular to the partition wall 128. On the other hand, the pipe 120 is decreased in diameter in the right-left direction in FIG. 8. In this case, the partition wall 128 is subjected to compressive force, and accordingly, the end convex portions 130 and the concave portion 132 are deformed such that their curvatures are increased.

In the bending process for the pipe 120, even if the pipe 120 is bent in positions different from those of FIG. 7 and FIG. 8, the end convex portions 130 and the concave portion 132 of the partition wall 128 can be variously deformed in accordance with applied force.

(Operation and Effects of Embodiment)

A description will be given of the operation and effects of the present embodiment. In the pipe 120 of the present embodiment, the inner space 127 of the tube main body 125 is partitioned by the partition wall 128 into the first area 121 and the second area 122. Thus, by arranging the electric wires 118 and 119 into the respective first area 121 and the second area 122, the electric wires 118 and 119 is easily shielded without shielding the electric wires 118 and 119 individually.

Further, the partition wall 128 includes the pair of end convex portions 130 and the concave portion 132. Thus, even when the pipe 120 is bent in any directions, at least the end convex portions 130 or the concave portion 132 is bent in accordance with applied force. As a result, the pipe 120 can be easily bent.

The ribs 133 at the inner wall 126 of the tube main body 125 and the end convex portions 130 and concave portion 132 of the partition wall 128 form uneven shapes. The first area 121 and the second area 122 are defined by the uneven shapes and thus the electric wires 118 and 119 are less likely to roll freely in the inner space 127 of the tube main body 125. Thus, collision of the electric wires 118 and 119 in the inner space 127 of the tube main body 125 and collision of the electric wires 118 and 119 with the inner wall 126 of the tube main body 125 is less likely to occur. Accordingly, the electric wires 118 and 119 can be reliably protected.

Further, according to the present embodiment, the radius of curvature RA of the end convex portions 130 is the same as the radius RB of the first electric wires 118 in the first area 121, or greater than the radius RB of the first electric wires 118. Accordingly, as illustrated in FIG. 5 and FIG. 6, the first electric wires 118 are less likely to fit in the end convex portions 130 at the first area 121 side. As a result, when the pipe 120 is bending, the first electric wires 118 are less likely to be fitted in and compressed by the respective end convex portions 130 on the first area 121 side. Thus, when the pipe 120 is processed to be bent, the first electric wires 118 are protected. For example, when the pipe 120 is bent as illustrated in FIG. 7, the clearances 129A are present among the first electric wires 118, the inner wall 126 of the tube main body 125, and the partition wall 128 in the first area 121. Even when the pipe 120 is bent as illustrated in FIG. 8, the clearances 129A are present among the first electric wires 118, the inner wall 126 of the tube main body 125, and the partition wall 128 in the first area 121.

In the present embodiment, the ribs 133 are at the portion of the inner wall 126 of the tube main body 125 facing the second area 122, and opposite the respective end convex portions 130 of the partition wall 128. Accordingly, in the second area 122, the spaces between the ribs 133 and the respective end convex portions 130 are smaller than those of the other portions. Thus, the second electric wire 119 is less likely to pass and roll though the spaces between the ribs 133 and the end convex portions 130.

The distance between the ribs 133 and the respective end convex portions 130 is smaller than the diameter of the second electric wire 119 in the second area 122. Thus, the second electric wire 119 is further less likely to pass and roll through the spaces between the ribs 133 and the end convex portions 130 (see FIG. 6).

According to the present embodiment, of the plurality of electric wires 118 and 119, the first electric wires 118 in the first area 121 and the second electric wire 119 in the second area 122 are different types of electric wires. Since the different types of electric wires 118 and 119 are arranged in the first area 121 and the second area 122 respectively, the electric wires 118 and 119 in different type are shielded without shielding the wires individually.

According to the present embodiment, the portion of the inner wall 126 of the tube main body 125 facing the first area 121 and the wall surface of the partition wall 128 facing the first area 121 continue to each other with the smoothly curved surfaces 131 therebetween. The inner wall 126 of the tube main body 125 facing the second area 122 and the wall surface of the partition wall 128 facing the second area 122 continue to each other with the smoothly curved surfaces 137 therebetween.

When the pipe 120 is bending, stress tends to be concentrated at the boundary portions between the inner wall 126 of the tube main body 125 and the partition wall 128. According to the present embodiment, the boundary portions between the inner wall 126 of the tube main body 125 and the partition wall 128 continue to each other with the curved surfaces 131 and 137 therebetween. Thus, the stress is less likely to concentrate at the boundary portions between the inner wall 126 of the tube main body 125 and the partition wall 128. As a result, it is not necessary to strictly consider the strength of the boundary portions between the inner wall 126 of the tube main body 125 and the partition wall 128 for the bending the pipe 120. Thus, the bending process for the pipe 120 can be easily performed.

Further, according to the present embodiment, the clearances 129A are present between the insulation coatings of the first electric wires 118 and the portion of the inner wall 126 of the tube main body 125 and the wall surface of the partition wall 128 facing the first area 121. In addition, the clearances 129B are present between the second electric wire 119 and the portion of the inner wall 126 of the tube main body 125 and the wall surface of the partition wall 128 facing the second area 122. Thus, the bending process can be performed without damaging the insulation coatings 124A and 124B of the electric wires 118 and 119.

<Fifth Embodiment>

A description will be given of a shield conducting path 150 according to a fifth embodiment with reference to FIG. 9. In the present embodiment, a partition wall 152 included in a pipe 151 includes two concave portions 154 between a pair of end convex portions 153. The radii of curvature of the two concave portions 154 are the same values. The radii of curvature of the two concave portions 154 may be different values.

The partition wall 152 further includes an intermediate convex portion 157 between the two concave portions 154. The intermediate convex portion 157 is a different portion from the end convex portions 153 and has a curved shape that extends in a downward direction (from a first area 155 toward a second area 156) in FIG. 9. The intermediate concave portion 157 is formed by extrusion molding.

A tube main body 158 includes three ribs 160A, 160B, and 160C that protrude from a portion of an inner wall 159 facing the second area 156 toward inside of the tube main body 158. The ribs 160A, 160B, and 160C extend in the axial direction of the tube main body 158 (the direction penetrating the sheet of FIG. 9), and extend over the entire length of the tube main body 158. The tube main body 158 and the ribs 160A, 160B, and 160C are integrally formed as a unitary member by extrusion molding.

Figure 9:
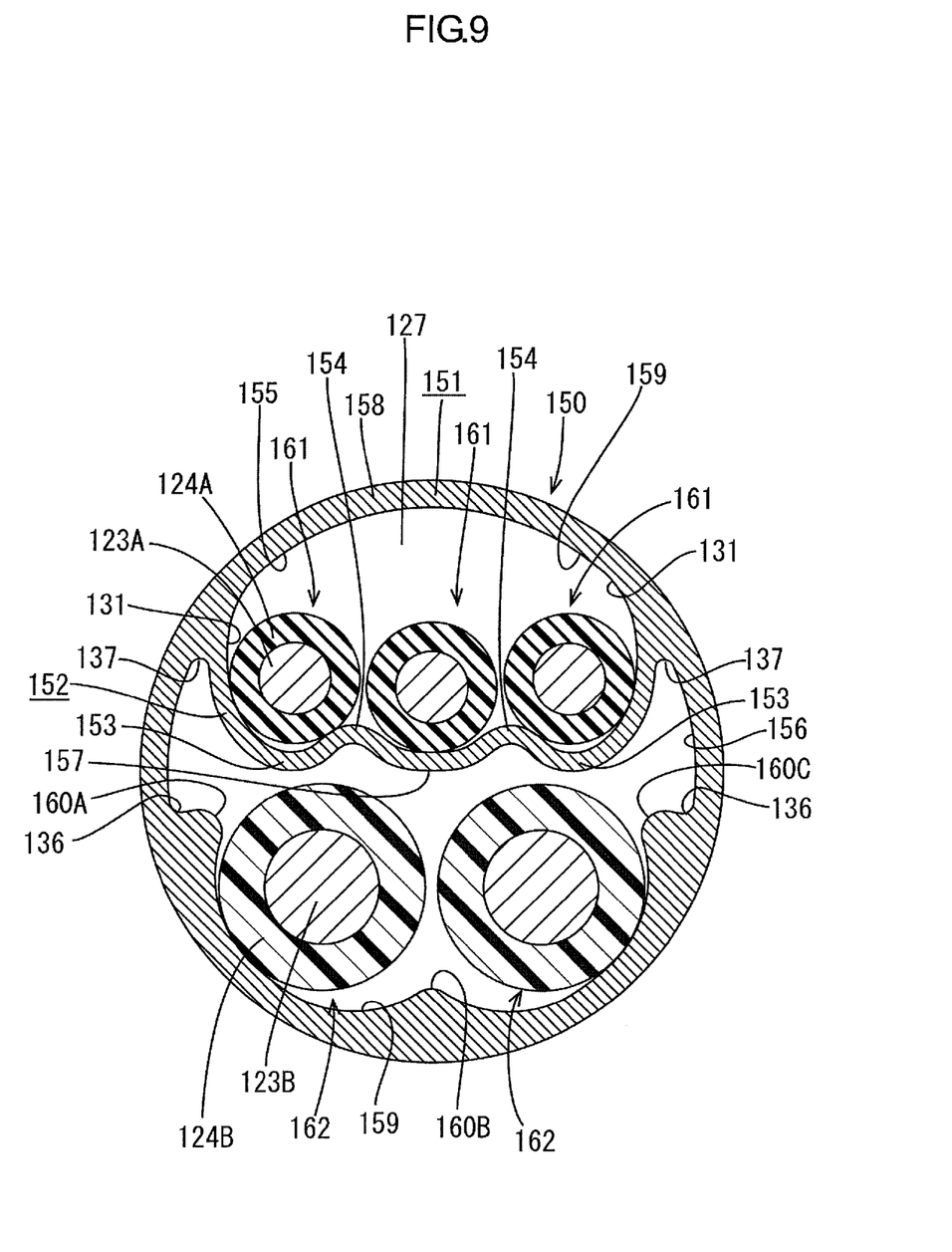
FIG. 9 is a cross sectional view of a shield conducting path according to a fifth embodiment.

The two ribs 160A and 160C positioned closer to the right end and the left end in FIG. 9 are opposite the two end convex portions 153 of the partition wall 152. The rib 160B about the middle in the right-left direction in FIG. 9 is opposite the intermediate convex portion 157 of the partition wall 152.

In the first area 155, three first electric wires 161 are arranged. In the second area 156, two second electric wires 162 are arranged.

The embodiment is substantially similar to the fourth embodiment except for the above-described configuration. Thus, the same members are designated by the same reference numerals and redundant descriptions thereof will be omitted.

In the present embodiment, the partition wall 152 includes the intermediate convex portion 157 that is different from the end convex portions 153. The intermediate convex portion 157 curves in the direction from the first area 155 to the second area 156. The rib 160B is at the position opposite the intermediate convex portion 157. Thus, in the second area 156, the space between the rib 160B and the intermediate convex portion 157 is smaller than those of the other portions. Accordingly, the second electric wires 162 are less likely to pass and roll through the space between the rib 160B and the intermediate protrusion 157.

<Other Embodiments>

The technique disclosed herein is not limited to the embodiments described above with reference to the drawings. The technical scope of the technique disclosed herein may include the following embodiments, for example.

(1) In the above embodiment, the plural types (two types or three types) of electric wires are inserted into the insertion spaces of the tube main body by type. However, a plurality of electric wires of the same type may be inserted separately into a plurality of separate insertion spaces.

(2) The cross sectional shape of the pipe may be an approximate oval or an approximate polygon instead of an approximate circle.

(3) The metal pipe may be formed by welding in addition to the structure which is integrally formed by extrusion molding.

(4) A wire rod such as an optical fiber or the like may be additionally inserted into the pipe.

(5) The cross section of the electric wire may be formed into a flat shape, an approximately oval shape, an approximately elliptic shape, an approximately rectangular shape and the like in addition to the approximately circular shape.

(6) The diameter of the cross section of the inserted electric wire may be the same or about the same.

(7) In the fourth and fifth embodiments, the end convex portions, the intermediate convex portion, and the concave portion are smoothly curved as viewed in the axial direction of the pipe. However, the portions may have a bent shape with a vertex as viewed from the axial direction of the pipe, or both a smoothly curved shape and a bent shape.

(8) In the fourth and fifth embodiments, the ribs are formed in the second area. However, the ribs may be formed in the first area.

(9) In the fourth embodiment, the inner wall 126 of the tube main body 125 and the partition wall 128 continue to each other with the smoothly curved surfaces 131 and 137 therebetween. However, boundaries or steps may be formed between the inner wall 126 of the tube main body 125 and the partition wall 128.

(10) In the fourth and fifth embodiments, two or three ribs are at the inner wall of the tube main body. However, one rib or four or more ribs may be at the inner wall of the tube main body.

(11) The fifth embodiment includes one intermediate convex portion 157. However, the number of the intermediate convex portions 157 may be two or more.

(12) The fourth and fifth embodiments include one or two concave portions. However, the number of the concave portions may be three or more.

(13) In the fourth and fifth embodiments, two or three electric wires are arranged in the first area. However, four or more electric wires may be arranged.

(14) In the fourth and fifth embodiments, one or two electric wires are arranged in the second area. However, three or more electric wires may be arranged.

(15) In the fourth and fifth embodiments, the ribs are at the positions opposite the respective end convex portions and the intermediate concave portion. However, the ribs may be at any positions as needed.

(16) In the fourth and fifth embodiments, the bending process is performed to the pipe. However, the bending process may not be performed to the pipe.

(17) In the fourth embodiment, the distance between the ribs 133 and the respective end convex portions 130 is smaller than the outer diameter of the second electric wire 119. However, the distance between the ribs 133 and the end convex portions 130 may be equal to the outer diameter of the second electric wire 119, or greater than the outer diameter of the second electric wire 119.

(18) In the fifth embodiment, the distance between the rib 160B and the intermediate convex portion 157 is greater than the diameter of the second electric wires 162 in the second area 156. However, the distance between the rib 160B and the intermediate protrusion 157 may be equal to the diameter of the second electric wires 162 in the second area 156, or smaller than the diameter of the second electric wires 162. Thus, the second electric wires 162 are less likely to pass and roll through the space between the rib 160B and the intermediate convex portion 157.

The invention claimed is:

1. A shield conducting path comprising:
    a plurality of electric wires each of which including an electric conductor and an insulation coating surrounding the electric conductor; and
    a metal pipe for shielding and protecting the electric wires arranged therein, wherein
    the pipe includes a cylindrical tube main body in which the electric wires are arranged and a partition wall continuing to an inner wall of the tube main body and partitioning an inner space of the tube main body into a first area and a second area,
    the partition wall includes:
        a pair of end convex portions, each of the end convex portions being an edge portion of the partition wall and adjacent to the inner wall of the tube main body, and curving so as to protrude in a direction from the first area toward the second area; and
        a concave portion between the pair of end convex portions, the concave portion curving so as to be recessed in an opposite direction from the direction in which each of the end convex portions protrudes, and
    the inner wall of the tube main body includes ribs protruding inward of the tube main body and extending in an axial direction of the tube main body.

2. The shield conducting path according to claim 1, wherein
    at least one of the plurality of electric wires is arranged in the first area, and
    each of the end convex portions has a radius of curvature that is equal to or greater than a radius of the at least one of the electric wires in the first area.

3. The shield conducting path according to claim 1, wherein each of the ribs is at a portion of the inner wall of the tube main body positioned in the second area and opposite to the corresponding end convex portion of the partition wall.

4. The shield conducting path according to claim 1, wherein at least one of the plurality of electric wires is arranged in the second area, and
    a distance between each of the ribs and the corresponding end convex portion is smaller than a diameter of the at least one of the electric wires in the second area.

5. The shield conducting path according to claim 1, wherein the partition wall includes an intermediate convex portion different from the end convex portions, the intermediate convex portion curving away from the first area toward the second area as a projection; and
    the inner wall further includes another rib protruding inward of the tube main body, the other rib being opposite the intermediate convex portion.

6. The shield conducting path according to claim 1, wherein the plurality of electric wires includes a first electric wire in the first area and a second electric wire in the second area, the first electric wire and the second electric wire being different types of electric wires.

7. The shield conducting path according to claim 1, wherein
    a portion of the inner wall of the tube main body facing the first area and a wall surface of the partition wall facing the first area smoothly continue to each other; and
    a portion of the inner wall of the tube main body facing the second area and a wall surface of the partition wall facing the second area smoothly continue to each other.

8. The shield conducting path according to claim 1, wherein the ribs prevent the electric wires from freely rolling in the tube main body.

9. The shield conducting path according to claim 1, wherein the plurality of electric wires are arranged at least in the first area or in the second area.

10. The shield conducting path according to claim 1, wherein the ribs extend in the axial direction of the tube main body over an entire length of the tube main body.

* * * * *